Aug. 27, 1963
C. L. STUPFEL ETAL
3,101,755
LUMBER EDGING AND SEPARATING APPARATUS
Filed July 3, 1961
3 Sheets-Sheet 1
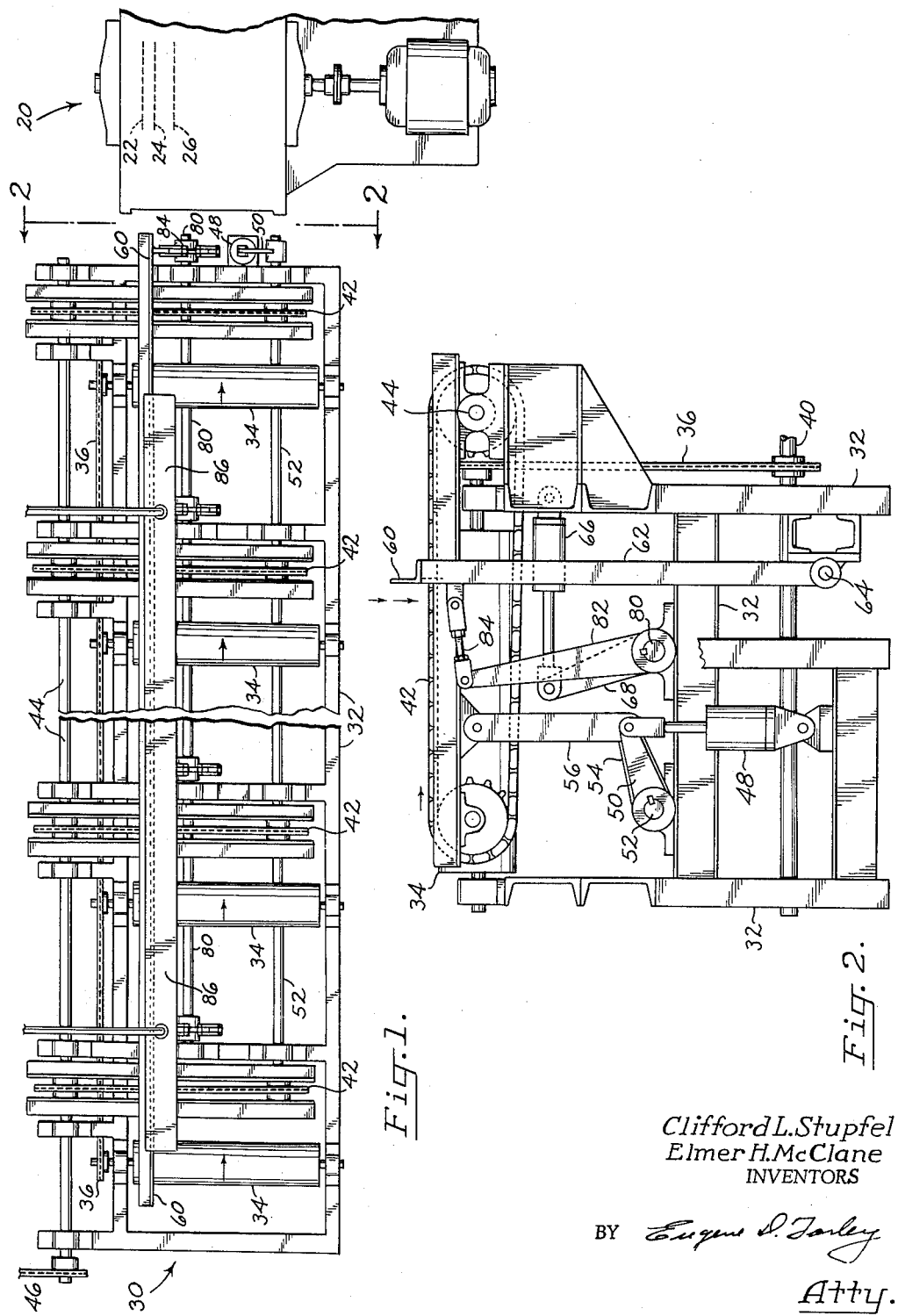
Clifford L. Stupfel
Elmer H. McClane
INVENTORS
BY
Atty.

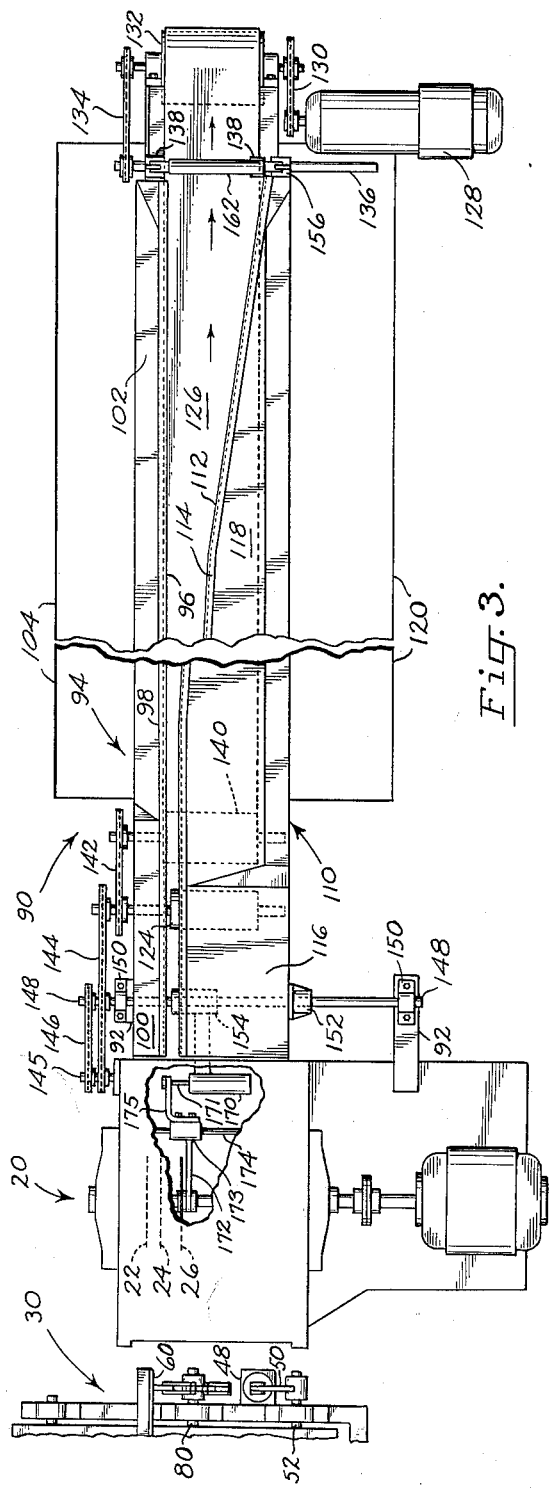
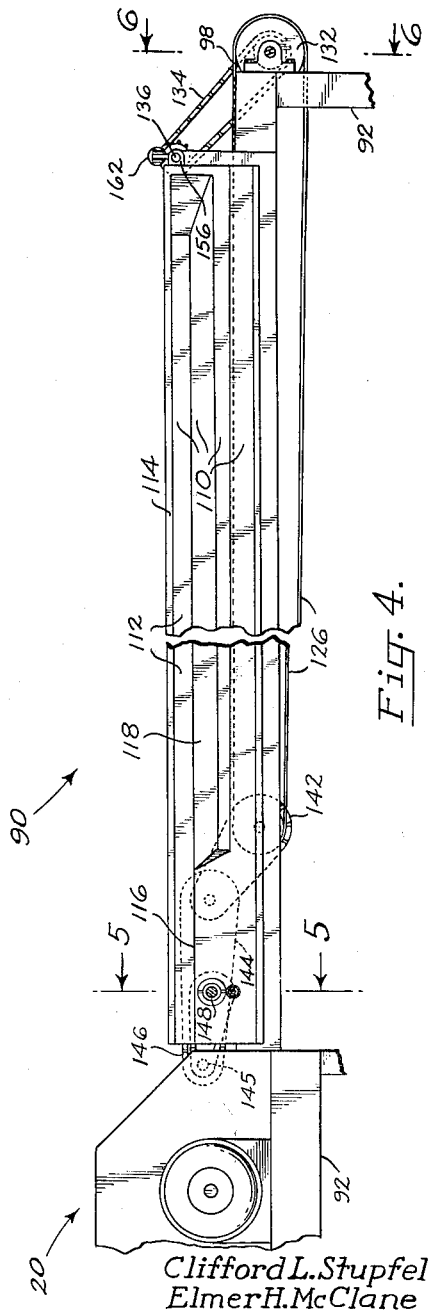
Fig. 3.
Fig. 4.
Clifford L. Stupfel
Elmer H. McClane
INVENTORS
Atty.

Aug. 27, 1963 C. L. STUPFEL ETAL 3,101,755
LUMBER EDGING AND SEPARATING APPARATUS
Filed July 3, 1961 3 Sheets-Sheet 3
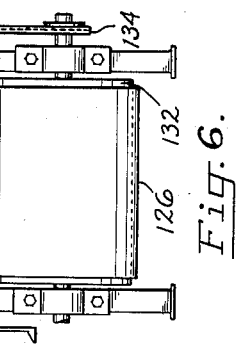
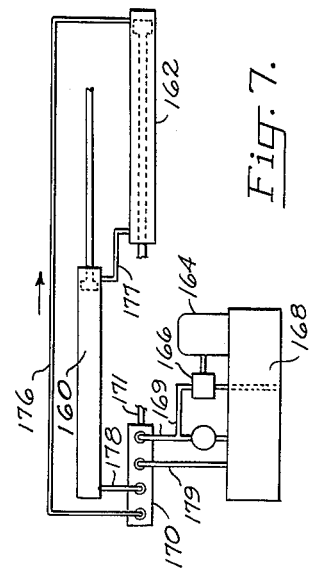
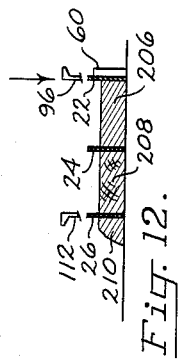
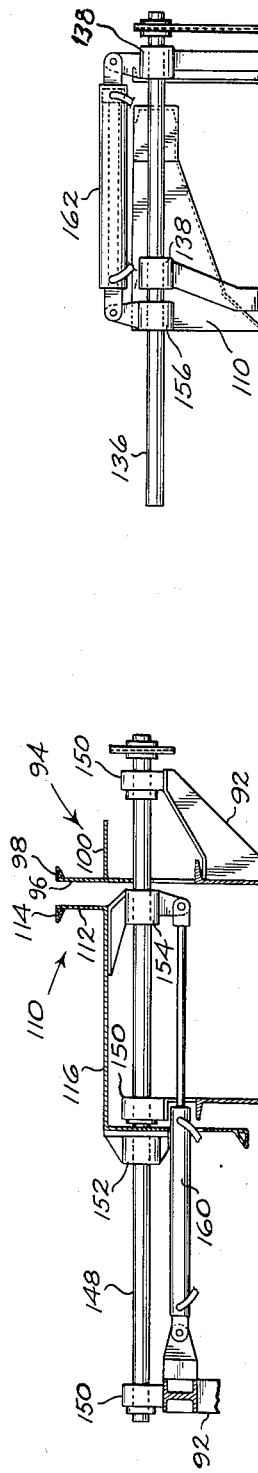
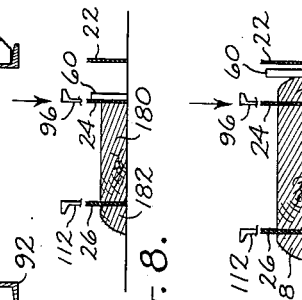
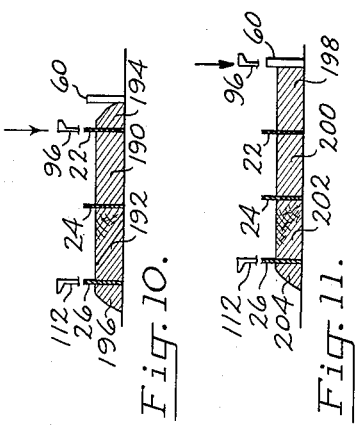
Clifford L. Stupfel
Elmer H. McClane
INVENTORS
BY *Eugene O. Farley*
*Atty.*

United States Patent Office 3,101,755
Patented Aug. 27, 1963

3,101,755
LUMBER EDGING AND SEPARATING
APPARATUS
Clifford L. Stupfel and Elmer H. McClane, Seattle,
Wash., assignors to Crown Zellerbach Corporation,
San Francisco, Calif., a corporation of Nevada
Filed July 3, 1961, Ser. No. 121,399
4 Claims. (Cl. 143—157)

This invention relates to apparatus for edging rough lumber and for separating the resulting boards from the edgings.

In sawmill operation, it is the usual practice first to break down the logs into rough lumber edged with bark and defective wood (wane) which must be trimmed away preliminary to producing the finished boards. The trimming operation is effectuated in an edger containing multiple saws which are adjustable laterally as required to remove the wane while at the same time sawing the remainder of the lumber into boards of predetermined width. The resulting wane strips or edgings then are separated manually from the boards, the former being transferred to the chipper or refuse burner, and the latter to further processing.

It is the general object of the present invention to provide apparatus for edging rough lumber and for separating automatically the resulting edgings and boards, thereby increasing materially the production capacity of the edging unit while at the same time reducing production costs, hazard and errors.

In the drawings:

FIG. 1 is a plan view of the infeed unit of the herein described lumber edging and separating apparatus;

FIG. 2 is an end view of the infeed unit looking in the direction of the arrows of line 2—2 of FIG. 1;

FIGS. 3 and 4 are, respectively, plan and side views illustrating particularly the outfeed unit of the presently described lumber edging and separating apparatus;

FIG. 5 is a sectional view taken along line 5—5 of FIG. 4;

FIG. 6 is an end view looking in the direction of the arrows of line 6—6 of FIG. 4;

FIG. 7 is a schematic view illustrating the hydraulic drive for the separating unit of FIGS. 4, 5 and 6; and FIGS. 8–12 inclusive are schematic sectional views through pieces of lumber of the various categories which may be processed by the presently described edging apparatus, illustrating the manner in which they are divided into boards and edgings as well as the manner in which the edgings are separated from the boards.

Generally stated, the herein described lumber edging and separating method comprises establishing a reference line along a longitudinal margin of a piece of lumber, cutting the piece longitudinally at laterally spaced intervals with respect to the reference line, thereby forming at least one board and one edging, separating the board from the edging, and conveying the two products away to separate locations for separate processing. Depending upon whether the wane appears on both edges or but a single edge of the rough lumber and, in the event that it occurs on but a single edge, upon whether that edge is the near edge or far edge with relation to the reference line, the latter may be established to mark the dividing line between the wane and the sound lumber, where the wane appears on the near edge, or the reference line from which the saw spacing is determined, where the wane appears on the far edge.

The apparatus employed for carrying out the foregoing method broadly comprises an edger having an inside saw, a central saw, an outside saw, all of which are adjustable laterally with respect to each, together with cooperating infeed and off-bearing units. The infeed unit is provided with a laterally adjustable stop and a fixed shadow line apparatus. The off-bearing apparatus is provided with a fixed divider which is aligned with the inside saw or middle saw, depending upon the edger setting, and with a laterally shiftable divider which is alignable with the outer saw. Separate conveying means are provided for conveying away the material passing through the edger and between the two dividers, i.e. the boards, from the material passing through the edger and outside the two dividers, i.e. the edgings or wane. This results in an efficient and automatic separation of the two products.

As shown in FIGS. 1 and 3, the herein described lumber edging and separating apparatus comprises basically the combination of an edger 20, an edger infeed unit 30 and an edger outfeed unit 90. The edger 20 is of the conventional type including a plurality of saws, i.e. an inside saw 22, a central saw 24 and an outside saw 26. These are mounted on a common shaft and are adjustable laterally by an hydraulic system or otherwise so that the saws may be set as required to trim the wane from the rough lumber fed to it, as well as to divide the lumber into the predetermined number of boards.

The infeed unit 30 receives the rough lumber from the mill production line, one piece at a time, aligns it in the desired manner with the saws, and conveys it against the same.

The outfeed unit 90 receives the edgings and boards from edger 20, separates them, and conveys them away to separate locations for disposal or further processing.

Turning now to infeed unit 30, the construction of which is shown particularly in FIGS. 1 and 2:

Rotatably mounted on a frame 32 are a plurality of live rolls 34. These are driven at a uniform rate in the direction of edger 20 from a common chain and sprocket assembly 36 connected to a drive shaft 40.

The pieces of raw lumber are delivered one at a time from a side conveyor, not illustrated, but communicating with tiltable drive chain units 42. One end of each of these is pivotally mounted on a common shaft 44, which also serves as a drive shaft, being connected through chain and sprocket 46 to a source of power. The other end of each of the chain units is coupled to a shifting mechanism illustrated in FIG. 2.

A fluid operated cylinder 48 (FIG. 2) is connected through a lever 50 to a rock shaft 52. Fixed to the rock shaft are a plurality of levers 54, one for each of drive chain units 42 to which they are connected by links 56. Thus extension of cylinder 48 results in elevation of the drive chain units to the position of FIG. 2 wherein they are above the plane of live rolls 34. Retraction of the cylinder lowers the drive chain units below the plane of the live rolls. Hence the rough lumber may be passed onto the infeed unit by the drive chains when they are elevated, and deposited on the live rolls for introduction into the edger when the drive chains are lowered.

So much of the edger infeed unit 30 is conventional. However, in accordance with the present invention, adjustable means are provided for locating the lumber piece with respect to the saws of the edger and the separating elements of the outfeed unit.

In the illustrated form of the invention, the locating means comprises a stop 60 extending the length of the unit immediately above chain drive units 42 and live rolls 34. Accordingly the lumber pieces introduced to the unit by drive chains 42 will be moved across it until they abut stop 60 when they are ready to be lowered onto live rolls 34.

Stop 60 is mounted on the upper end of a plurality of spaced lever arms 62, the lower ends of which are pivoted to a common shaft 64. Precise lateral adjustment of the stop is obtained by application of a cylinder 66, the piston rod of which is coupled to one end of a lever 68 and the other end of which is keyed to shaft 80. The lower ends of spaced levers 82 are fixed to the same shaft, the upper ends of these levers being pivotally connected through links 84 to levers 62 which support the stop.

Means also are present on the infeed unit to establish a reference line for defining the edging or wane portion to be separated from the lumber piece so that corresponding adjustment can be made in the edger and outfeed units of the apparatus. The means employed for this purpose is a standard shadow line illuminating fixture 86 suspended over the work in a fixed longitudinal position. This assembly comprises a light box fitted with suitable reflectors and with a cable running its entire length below the source of illumination. The arrangement is such that a distinct shadow line is thrown on the work in the general position indicated by the vertical arrows of FIG. 2.

As indicated above, outfeed unit 90 serves the dual functions of separating the edgings from the boards and for conveying these two end products away to separate locations. Its construction is illustrated in FIGS. 3–7 inclusive.

The outfeed unit is mounted on a suitable frame 92 and stationed immediately behind edger 20, aligned with infeed unit 30. It comprises a stationary separator 94 including a vertical plate 96 supported by frame 92 and having an outwardly bent top section 98. The plate is aligned with the shadow line cast by light unit 86 as well as with one of saws 22, 24 in the kerf produced by which it is insertable. A flat apron section 100 extends laterally outwardly from separating plate 96 at its infeed end and merges with a downwardly sloping apron section 102 at its outfeed end. The latter discharges into a bin 104 which may be equipped with an outfeed conveyor, not illustrated.

Also included in the outfeed assembly is a laterally shiftable separator or divider indicated generally at 110. It comprises a vertical plate 112 mounted on the frame of the apparatus and having an angled top segment 114. A flat table 116 extends outwardly at right angles from the plate at its infeed end and merges with a downwardly and outwardly sloping apron 118 at its outfeed end. Apron 118 discharges into a bin 120 in the bottom of which may be located an off-bearing conveyor, not illustrated.

Apron 118 is at a lower level than table 116 to insure that the work clears the edger saws as soon as possible, increasing their production capacity. The work is moved through the outfeed unit by driven roll 124, slightly below the level of apron segments 100, 116, and by an endless belt 126 located at a lower level in the space between dividers 96, 112. These propelling units are driven by a motor 128 connected through chain 130 to the shaft of a pulley 132 which mounts one end of belt 126. Connected to the other end of the shaft is a chain 134 which drives a rotating shaft 136 mounted in stationary bearings 138 and used in adjusting the position of divider 112, as will appear hereinafter.

The other end, i.e. the infeed end, of endless belt 126 is mounted on a pulley 140 to the shaft of which is connected a chain 142. This chain is connected to the shaft of drive roll 124. The latter, in turn, is connected through chain 144 to a rotatable shaft 145. To this shaft is connected another chain 146 which drives a shaft 148 rotatably mounted in stationary bearings 150. This shaft, and rotating shaft 136, with which it cooperates, mounts the mechanism for supporting and adjusting separator 112.

As indicated above, separator 112 is aligned with and moves with outside saw 26 of the edger. Accordingly, it may be tied to the mechanism employed for shifting the saw, and moves precisely with it.

Thus the infeed end of the separator may be mounted on a pair of collars 152, 154 slidably mounted on rotating shaft 148 (FIG. 5). Its outfeed end may be supported on collar 156 slidably mounted on revolving shaft 136 (FIG. 6).

Lateral adjustment of the divider is secured through the agency of a pair of cooperating hydraulic cylinders 160 and 162, the circuit for which is illustrated schematically in FIG. 7.

At the infeed end of the unit is a first hydraulic cylinder 160, supported on frame 92 with its piston rod coupled to sliding collar 154. At the outfeed end of the unit is a companion cylinder 162 mounted on the frame of the unit with its piston rod coupled to sliding collar 156. The two cylinders are arranged so that when cylinder 160 is extended, cylinder 162 is retracted.

A motor 164 drives pump 166 which draws fluid from reservoir 168 and passes it via line 169 into four-way slave valve 170 which is mounted on moving separator 110 (FIG. 3). This valve is operated by the edger setworks controlling outside saw 26 of the edger to which it is tied by mechanical means built into the edger.

Accordingly, if outside saw 26 is shifted by the edger setworks laterally away from the fixed separator, its lateral motion is transmitted to valve actuator 171 through a suitable connecting linkage (FIG. 3) including, for example, arm 172 interconnecting saw 26 with a slide 173, slidably mounted on rod 174; and arm 175 interconnecting slide 173 and valve actuator 171. Thus, the actuator follows the movement of the saw and opens valve 170 to pass fluid through conduit 176 in the direction of the arrow (FIG. 7).

The piston rod of cylinder 162 thereupon advances, fluid flows through line 177 to cylinder 160, and the piston rod of cylinder 160 retracts passing fluid to valve 170 through line 178. Thence it returns to reservoir 168 through line 179. The net result will be to move divider assembly 110 from right to left as viewed in FIG. 5.

Shifting saw 26 toward the fixed separator reverses the fluid flow through the cylinders and causes a reverse movement of the assembly from left to right. This maintains divider plate 112 at all times aligned precisely with saw 26.

*Operation*

It is a particular feature of the presently described apparatus that it is sufficiently versatile to process rapidly and efficiently the diverse types of rough lumber conventionally encountered in sawmill edger operation. Several of these are illustrated in FIGS. 8–12.

Thus, as shown in FIG. 8, the lumber piece may have a squared inner edge and an unfinished outer edge, its dimensions being such as to make desirable sawing it into a board 180 and edging 182. To accomplish this, the lumber piece is fed laterally against stop 60 by infeed chain units 42 in their elevated position. Saws 22, 24, 26 of the edger unit are adjusted so that saw 22 lies in inoperative position, saw 24 is aligned with the squared side edge of the piece of lumber, and saw 26 is set to cut an edging strip of the desired width, removing the wane. When this setting is made, divider 112 follows saw 26 and is aligned with it. Saw 24 is set to the fixed position of divider 96.

Accordingly when drive chain units 42 are lowered, the lumber piece is transferred to edger infeed rolls 34 which drive the piece through the saws, dividing it into board 180 and edging 182.

As the piece passes through the saw, it passes across table 116 of separating unit 90, this being at substantially the same elevation as the edger saw table. Divider 112 enters the saw kerf produced by saw 26. Stationary divider 96 is inoperative. As a consequence, the board drops downwardly onto conveyor 126 which conveys it away to further processing. Edging 182, however, is guided outwardly and downwardly by apron 118 and drops into chute 120 for conveyance to any desired destination such as the chipper or refuse burner.

Assuming that the next lumber piece is to be divided into one board and two edging strips, as illustrated in FIG. 9, it is introduced into the infeed unit against stop 60 in the manner previously described. In this case, however, the stop is adjusted inwardly, i.e. to the right in FIG. 2, by operation of cylinder 66 and associated linkages, until the shadow line (vertical arrows) thrown on the work by reflecting light box 86 defines edging strip 186. The saws then are adjusted until saw 22 is in its inoperative position behind the work, saw 24 is positioned to remove edging strip 186 and is aligned with stationary divider 96, and saw 26 is adjusted to cut away edging strip 188 and is aligned with shiftable divider 112. Then as the lumber piece passes through the saw, divider 96 enters the kerf produced by saw 24 while divider 112 enters the kerf produced by saw 26. Edging piece 186 thus is guided outwardly and downwardly by apron 102 into hopper 104. Edging strip 188 is conveyed outwardly and downwardly by apron 118 into hopper 120. Board 184 passes between the two dividers and drops downwardly onto outfeed conveyor belt 126.

In the situation illustrated in FIG. 10, the rough lumber piece is to be divided into two boards 190, 192 and two edgings 194, 196. Accordingly the piece is placed on the infeed conveyor with the inner edge abutting stop 60 in its initial or zero position aligned with fixed separator 96 as well as with the reference shadow line cast by light source 86. The stop is moved inwardly, the work following, until the reference shadow line defines wane strip 194. The saws then are set, saw 22 aligning with the shadow line and fixed divider 96, saw 26 aligning with movable divider 112 and positioned for trimming off wane strip 196, and saw 24 being in an intermediate position for cutting boards 190, 192. Upon passing the lumber piece through the edger, a separator 96 will enter the kerf of saw 22 and guide wane strip 194 into chute 104.

Divider 112 will enter the kerf of saw 26 separating wane strip 196 and guiding it into chute 120. Boards 190, 192 will pass between the two dividers and be carried away on conveyor 126.

The lumber piece illustrated in FIG. 11 represents a situation in which the inside edge of the piece is square, the outside portion is edged with wane, and the central portion is to be divided into three boards. In this situation the piece is placed on the infeed unit with the square edge abutting stop 60, aligned with stationary divider 96 and the reference shadow line cast by light source 86. The saws are set with outer saw 26 arranged to saw off outside wane strip 204 and inner saws 22, 24 arranged to cut boards 198, 200, 202. When the lumber piece is passed through the edger onto the separating and off-bearing unit, separator 96 is inoperative while separator 26 separates wane strip 204 and passes it to chute 120. Boards 200, 202, 204 are conveyed away on conveyor 126.

The lumber piece of FIG. 12 represents a situation similar to that shown in FIG. 11, except that in this instance it is desired to divide the piece into two boards rather than three. Hence, the piece is deposited on infeed unit 30 with the squared inner edge abutting stop 60 in its zero or starting position and aligned with saw 22, stationary divider 96 and the shadow line from light source 86. Without adjusting stop 60, the outer and center saws are set to trim off edging 210 and divide the central portion of the piece into boards 206, 208. Passage of the piece through the edger onto unit 90 results in forwarding boards 206, 208 outwardly on conveyor 126 and shunting edging 210 into chute 120.

In all of the above situations the weight of the leading portions of the edgings and board as they drop down from the plateau afforded by tables 100, 116, onto conveyors 126, or aprons 98, 118, respectively, causes the trailing end of the work to clear the saws at once. As a result, a new piece can be introduced into the edger immediately.

Hence it is possible, by practicing the presently described method and employing the apparatus described herein, to edge rough lumber and separate automatically the resulting edgings and boards. This increases materially the production capacity of the edging unit while at the same time reducing production costs, hazards and errors.

It is to be understood that the form of our invention herein shown and described is to be taken as a preferred example of the same and that various changes in the shape, size and arrangement of parts may be resorted to without departing from the spirit of our invention or the scope of the subjoined claims.

Having thus described our invention, we claim:

1. The combination of a lumber edger having a plurality of laterally adjustable saws, infeed means for feeding to the edger a rough board having wane along at least one side margin, means secured in a fixed position above the infeed means for establishing a reference line along the said side margin defining an edging to be cut by one of the saws, edge stop means on the infeed means mounted for adjustment laterally with respect to the reference line means for engagement by a longitudinal edge of lumber and defining with the reference line the lateral dimension of wane to be cut from the lumber, a stationary separator secured in a fixed position on the outfeed side of the saws, the stationary separator being aligned with the reference line means, and a laterally movable separator stationed on the outfeed side of the saws and alignable with one of the saws for separating the edging cut thereby from the other side of the lumber piece.

2. The apparatus of claim 1 wherein the edge stop means comprises a plurality of spaced vertical arms pivoted at their lower ends to a stationary member below the infeed means and connected at their upper ends to a horizontally arranged stop plate above the infeed means, a fluid operated cylinder, and link means interconnecting the cylinder and the arms for adjusting the stop plate to a predetermined position.

3. The apparatus of claim 1 wherein the means for establishing a reference line on the lumber piece comprise a light box superimposed above the piece, arranged longitudinally thereof, and provided with a linear shadow casting element.

4. The apparatus of claim 1 including means for adjusting the movable separator laterally comprising a frame, a plurality of slides on the frame supporting the separator, at least one hydraulic fluid operated cylinder supported on the frame and connected to the separator for adjusting the same at a predetermined position on the slides, and valve means associated with the cylinder and operable by movement of the associated edger saw to move the separator therewith.

References Cited in the file of this patent

UNITED STATES PATENTS

| | | |
|---|---|---|
| 326,454 | Rawlings | Sept. 15, 1885 |
| 711,947 | Dittbenner | Oct. 28, 1902 |
| 782,088 | Ward | Feb. 7, 1905 |
| 1,038,215 | Shaw | Sept. 10, 1912 |
| 1,269,288 | Landoll | June 11, 1918 |
| 2,510,471 | Horstkotte | June 6, 1950 |
| 2,806,492 | Becker | Sept. 17, 1957 |
| 3,017,909 | Bowling et al. | Jan. 23, 1962 |